United States Patent Office 3,452,796
Patented July 1, 1969

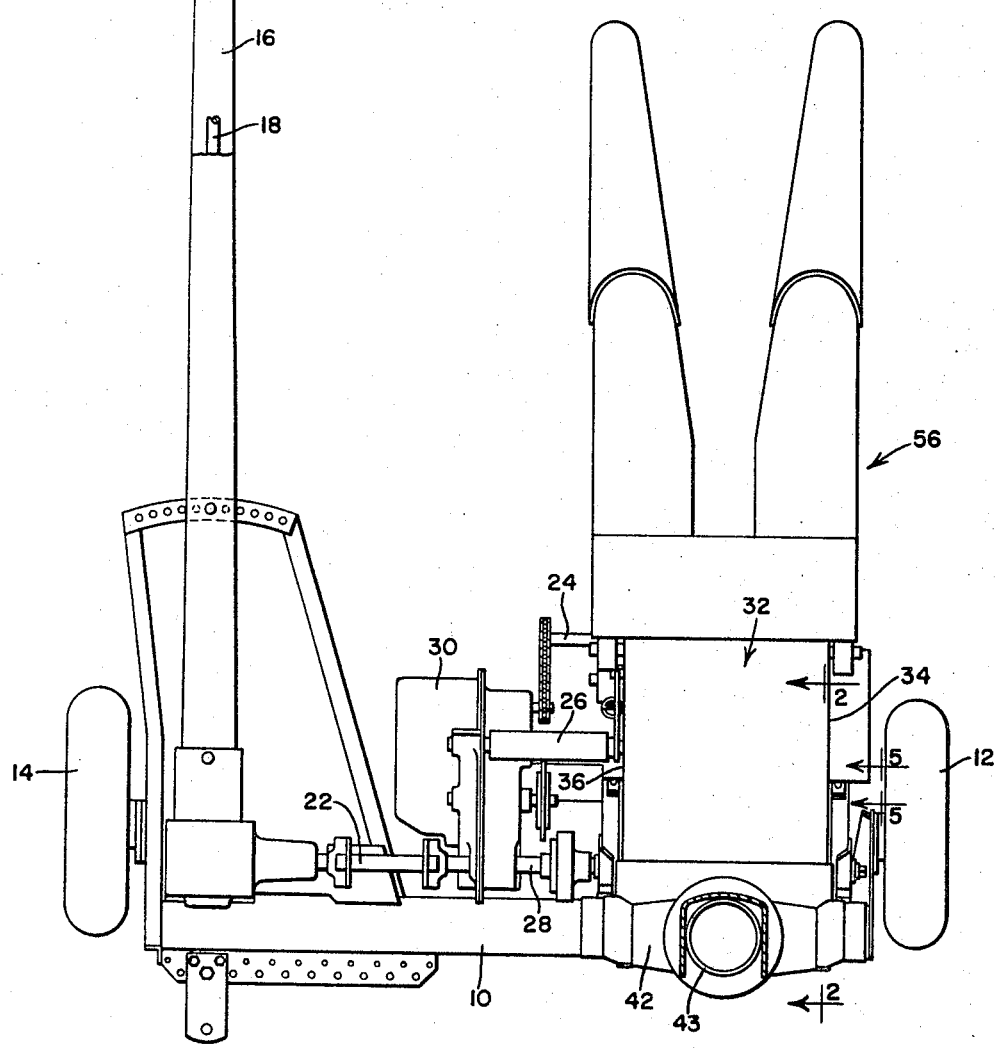
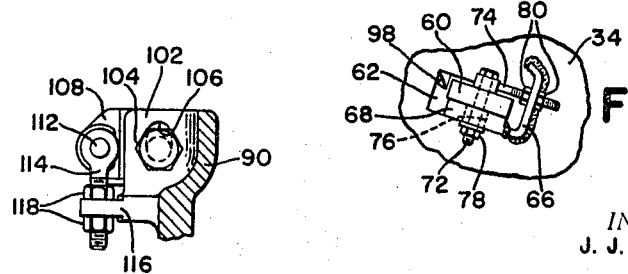

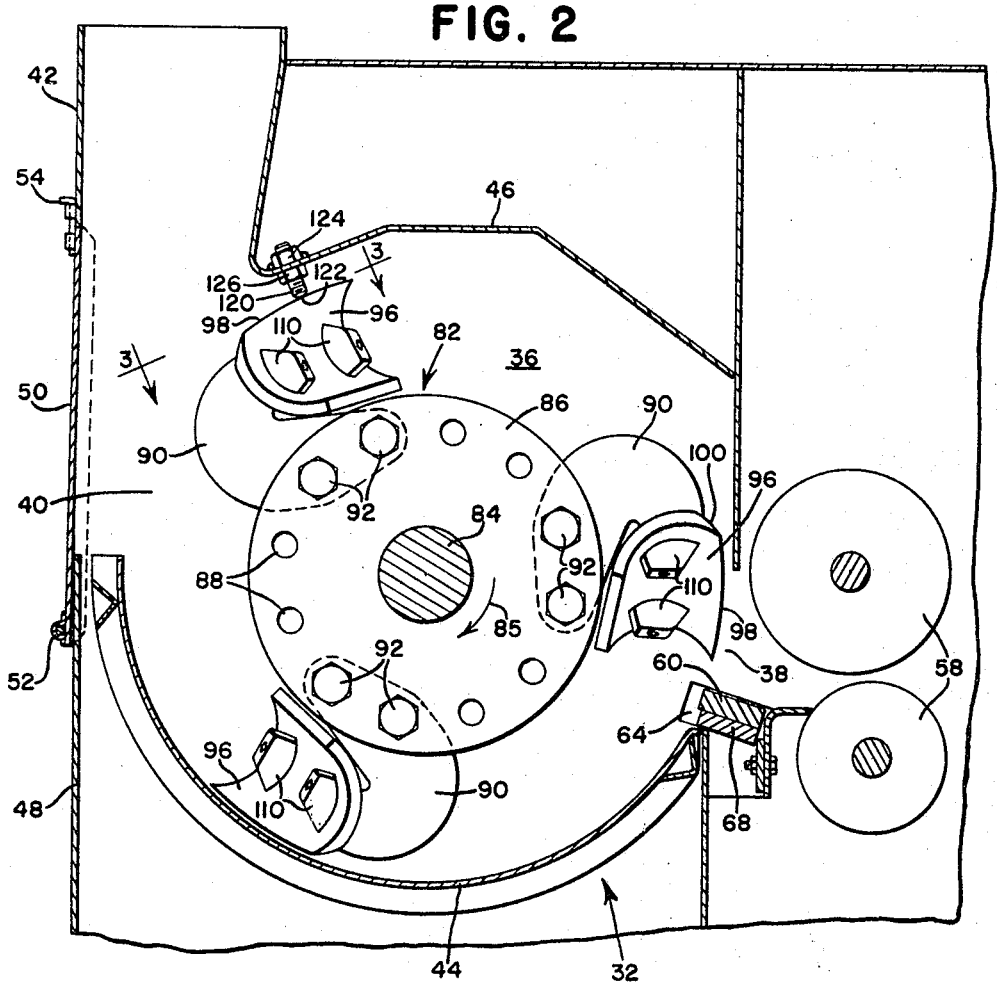

3,452,796
ADJUSTABLE CUTTERHEAD FOR A FORAGE HARVESTER
John Joseph Hennen, Ottumwa, Iowa, assignor to Deere & Company, Moline, Ill., a corporation of Delaware
Filed Aug. 11, 1966, Ser. No. 571,822
Int. Cl. A01f 43/00; A47j 7/00
U.S. Cl. 146—242                8 Claims

ABSTRACT OF THE DISCLOSURE

A forage harvester has a rotary reel type cutterhead formed by three equally spaced, longitudinally extending, cup-shaped knives mounted on a rotatable supporting structure diagonally relative to the cutterhead axis. The knives are adjustable on the supporting structure in a radial direction relative to the cutterhead axis to vary the diameter of the cylinder generated by the rotating knives. Gauge screws are provided on the cutterhead housing so that the knives can be successively adjusted relative to the gauge screws to the same radius.

---

This invention relates to a cylinder-type cutterhead for a forage harvester or the like and more particularly to improved means for mounting and adjusting the knives on such a cutterhead.

A forage harvester typically collects crop material from the field, reduces the crop by means of a rotary cutter, and delivers the chopped crop to a trailing wagon or the like. Many machines of this type utilize a cylinder, or reel-type cutterhead, which cooperates with a stationary knife or shear bar parallel to the cutterhead axis to reduce the crop as it is fed over the stationary knife and into the cutterhead path. Often the cutterhead also functions as an impeller for delivery of the reduced crop through a discharge spout and into the trailing receptacle, and, when the cutterhead also serves this function, cup-shaped knives, concave toward the direction of knife travel, are generally provided, the outer sharpened portion of the knife generally extending in a more tangential direction than the intermediate portion of the knife to provide a more effective cutting edge. It is also known to provide knives that extend in a generally diagonal direction relative to the cutterhead axis and the shear bar, so that the knives shear the material rather than chop it, and a more constant load is placed on the cutterhead. In order that the rotating knife edges will trace a true cylinder, the knives must also be twisted in addition to being bowed or cup-shaped, so that the knives form an approximately spiral-like segment of a cylinder.

In use, the cutterhead knives require relatively frequent sharpening, many forage harvesters being provided with integral knife-grinding equipment to facilitate the sharpening. The wear and grinding of the knives, of course, results in the loss of the proper register of the cutterhead knives with the shear bar. While the shear bar has been adjustable in a generally radial direction relative to the cutterhead, it has also been found desirable to provide for adjustment of the knives on the cutterhead, so that proper clearance between the housing and the cutterhead is obtained. It is also known to mount the knives for easy removal, so that the number of knives may be selectively varied to vary the length of cut. Of course, shifting or adding knives also necessitates adjustment of the knives so that each knife edge traces the same path and has the proper clearance with the housing and the shear bar.

Heretofore, the above-described spiral, cup-shaped knives have been mounted on the cutterhead via axially spaced mounting members and have been adjustable thereon about the longitudinal axis of curvature of the knives to change the cutterhead radius. However, since the knives have a spiral shape, with the sharpened portion of one end of the knife extending in a more radial direction than the opposite end relative to the cutterhead axis, to change the cutterhead radius at the one end requires a lesser movement of the knife about its axis of curvature than at the opposite end. Thus, if the cutterhead radius is changed the same amount at both ends of the knife, the knife must be twisted to some degree, placing the knife under an internal stress. Moreover, each knife is generally provided with a heel relief behind its cutting edge, and rotation of the knife about the axis of curvature affects the heel relief.

The primary object of the present invention is to provide a novel mounting for such cup-shaped, diagonal knives wherein adjustment of the knives on the cutterhead can be effected without changing the heel relief of the knife or twisting or stressing the knife. A more specific object is to provide an adjustable mounting means for such knives which permits generally radial adjustment of the knives relative to the cutterhead axis. Another object is to provide such adjustable mounting means for the cutterhead knives wherein the adjustment means is capable of moving the knives either inwardly or outwardly and also supports the knives in their adjusted position, and which further does not require knives that are sections of a perfect cylinder.

Another feature resides in the method of adjusting the knives on the cutterhead. Conventionally, access to the cutterhead is through a door in the cutterhead housing at the discharge opening, opposite the stationary knife. To adjust each knife on the cutterhead has heretofore required special tools or has entailed reaching through the cutterhead to measure the clearance between the knife and the shear bar, which of course is difficult, especially when a larger number of knives is being used on the cutterhead.

According to the present invention, adjustable gauge screws, which extend from the cutterhead housing to the cutterhead periphery, are provided at opposite ends of the cutterhead, adjacent to the discharge opening, the gauge screws providing easily observable bench marks or reference points for measuring the adjustment of the knives while the knives and their adjusting means are easily accessible through the access opening. Still another object is to provide a novel method of adjusting the cutterhead knives, utilizing the gauge screws.

These and other objects will become apparent from the following detailed description and accompanying drawings wherein:

FIG. 1 is a plan view of a typical forage harvester embodying the present invention.

FIG. 2 is an enlarged vertical section of the cutterhead portion of the harvester as viewed along the line 2—2 of FIG. 1.

FIG. 3 is a partial plan view of the cutterhead showing the mounting of a single knife thereon.

FIG. 4 is a fragmentary sectional view of one of the knife-mounting means as viewed along the line 4—4 of FIG. 3.

FIG. 5 is an enlarged fragmentary side elevation view of a portion of the cutterhead housing exterior, showing the mounting of the shear bar, as viewed generally along the line 5—5 of FIG. 1.

The forage harvester illustrated includes a mobile main frame 10, mounted for advance over a field on right and left support wheels 12 and 14, the forage harvester being conventionally connected to and towed by an agricultural tractor (not shown) by means of a forwardly extending draft member 16. The forage harvester is also conventionally powered by the tractor through a fore-and-aft drive shaft 18, connectible at its forward end to a tractor power take-off, the rearward end of the shaft being drivingly connected to a transverse drive shaft 22, which, in turn, drives an attachment drive 24, a feed roll drive 26, and a cutterhead drive shaft 28 through a transmission 30. It is to be understood that such words as "right," "left," "forward," "rearward," "upwardly," "vertical," "horizontal," etc. are terms of convenience used to more clearly describe the invention, and are not to be constructed as limitations.

A cutter housing, indicated in its entirety by the numeral 32, is mounted on the frame 10 adjacent the right wheel 12 and has a generally cylindrical configuration with a transverse axis relative to the direction of machine travel. The housing 32 includes a right end wall 34, a left end wall 36, a forwardly disposed, transversely elongated, inlet opening 38, extending between the end walls 34 and 36, and a rearward tangential outlet opening 40, also extending between the end walls 34 and 36. The outlet opening 40 communicates with an upwardly converging discharge housing 42, which in turn communicates with an upwardly extending discharge pipe 43, only a portion of which is shown in FIG. 1. An arcuate lower housing band 44, in the form of a section of a cylinder, extends between the inlet opening 38 and the outlet opening 40 and an upper housing band portion 46 extends from the outlet opening to the inlet opening opposite the lower band 44. The housing also includes an upright rear wall 48, having an access door 50, which is opposite the outlet opening 40 and swingable downwardly about a tarnsverse hinge 52 to provide access to the cutterhead housing interior. A latch 54 at the upper edge of the access door normally maintains the door in a closed position.

A harvesting attachment 56, here shown as a row crop unit, is mounted on the frame 10 forwardly of the cutterhead housing 32 and collects crops from the field in a conventional manner, moving it rearwardly to a plurality of transverse feed rolls 58, which, in turn, feed the crop rearwardly through the inlet opening 38 and over a transverse stationary knife or shear bar 60, which defines the lower edge of the inlet opening.

The opposite ends of the shear bar 60 respectively extend through openings 62 and 64 in the right and left end walls 34 and 36 and are attached to the housing by means of a pair of mounting brackets 66 respectively attached to the exterior side of the end walls 34 and 36. The shear bar 60 is supported above a fixed support bar 68 having its opposite ends attached to the mounting bracket 66. As best seen in FIG. 5, the shear bar 60 is adjustable on the fixed support bar 68 in a generally radial direction relative to the axis of the cutterhead housing 32, the shear bar being normally locked to the support bar by a pair of bolts 72 at opposite ends of the shear bar, each bolt extending downwardly through an eye-bolt 74 above the shear bar 60, through a bore in the shear bar, and through a slot 76 in the support bar 68. A nut 78 is threadable on each bolt 72 to releasably lock the shear bar and the support bar together, the slot 76 permitting said adjusting movement of the shear bar relative to the support bar only when the lock nut 78 is loosened. The threaded portion of each eye-bolt 74 extends in a generally fore-and-aft direction through a bore in the mounting bracket 66, and the adjusting movement of the shear bar 60 is accomplished by alternately tightening and loosening a pair of adjusting nuts 80 threadable on each eye-bolt 74 on opposite sides of the mounting brackets 66.

A cylinder-type cutterhead 82 is coaxially rotatable within the cutterhead housing 32 and includes an axial shaft 84, journaled at opposite ends in the end walls 34 and 36 and connected to and driven by the cutterhead drive shaft 28, the cutterhead being rotated in the direction of the arrow 85 in FIG. 2 during the operation of the machine. A pair of axially spaced radial members or disks 86 are coaxially affixed to the shaft 84 and include a plurality of transverse bores 88 equally spaced angularly and equally offset from the cutterhead axis. Three identical mounting brackets 90 extends radially from each disk 86 and are equally spaced angularly thereon, each mounting bracket 90 being removably attached to the respective disk 86 by a pair of bolts 92, extending through adjacent bores 88 and matching bores through the brackets 90 and locked therein by nuts 94. A longitudinally extending knife 96, bowed about its longitudinal axis and concave toward the direction of cutterhead rotation, is supported at its opposite ends by a pair of the mounting brackets 90, respectively carried by the two radial members or disks 86. The outer, sharpened edge 98 of each knife 96 traces a cylinder as the cutterhead rotates, and, as shown in FIGS. 2 and 3, the sharpened edge 98 of each knife 96 is canted a relatively small degree relative to the cutterhead axis and to the shear bar 60, in order that the entire length of the knife 96 does not pass the shear bar 60 at the same time, each knife having a slight twist or spiral in order that the cutting edge 98 will trace a true cylinder. A heel relief 100 is provided rearwardly of the sharpened edge 98 on each knife relative to the direction of rotation.

Each mounting bracket 90 has an outer, longitudinally extending portion 102, substantially parallel to the adjacent knife 96. Each end of each knife is releasably locked to its respective mounting bracket 90 by means of a bolt 104, extending in a generally circumferential direction through a slot 106, extending through the bracket portion 102 and elongated in a generally radial direction relative to the cutterhead axis, through a bore in a spacer member 108, having a flat surface on one side, which seats against the bracket portion 102, and an arcuate concave surface on the opposite side, which seats against the rearward convex side of the knife 96, and through a transverse bore through the knife 96, each bolt 104 being threaded into an internally threaded locking member 110 having a convex surface matching and seating against the concave forward surface of the knife. When a bolt 104 is tightened into its respective locking member 110, the knife 96 is locked to the respective bracket 90 at that particular point. However, if the bolt 104 is loosened, the generally radially extending slot 106 in the mounting bracket 90 permits a limited amount of knife movement on the mounting bracket in a generally radial direction relative to the cutterhead axis.

Each end of each knife 96 is also connected to its respective mounting bracket 90 by means of a generally circumferentially extending pin 112, which is pressed into a transverse bore in the knife 96 adjacent to the locking member 110 and extends through a bore through the spacer member 108 and through the eye of a generally radially extending eye-bolt 114. The threaded portion of the eye-bolt extends through a generally radial bore through a tab portion 116 of the bracket 90, the radial position of the eye-bolt 114 relative to the cutterhead axis being established by a pair of adjusting nuts 118 threaded on the eye-bolt and engaging opposite sides of the tab portion 116. Thus, if the locking bolt 104 is loosened, the knife 96 may be shifted in a radial direction at that particular mounting bracket by loosening one adjusting nut 118 and tightening the other adjusting nut.

Extending readially inwardly from the upper band portion 46, immediately forwardly of the outward opening 40, are a pair of gauge screws 120, having inner terminal ends 122 proximate to the cutterhead periphery, the gauge screws 120 being substantially transversely aligned and respectively extending toward the cutterhead proximate to the opposite ends of the cutterhead. The gauge screws are threadable in fixed nuts 124 attached to the exterior side of the band 46 and are thus radially adjustable relative to the cutterhead axis, the gauge screws being locked in their selected positions by lock nuts 126 mounted thereon and seating against the interior side of the band 46.

In operation, the crop is collected from the field by the harvesting means 56 and fed rearwardly by the feed rolls 58 through the inlet 38 and into the cutterhead 82, which cooperates with the shear bar 60 to reduce the crop and impel it upwardly through the outlet opening 40 and discharge pipe 43. The rate at which the crop is fed to the cutterhead is relatively constant. However, the speed of the cutterhead may be varied by changing the drive ratios in the transmission 30 and thereby vary the length of cut. Additional variation may be achieved by varying the number of knives on the cutterhead. The illustrated cutterhead has three equally spaced knives 96. However, the illustrated radial members or disks 86 have twelve equally spaced bores 88, and since each mounting bracket 90 only requires two bores 88, the disks 86 could accommodate six mounting brackets to provide a cutterhead with six knives. A four-knife cutterhead could be provided by mounting the brackets 90 on the disks 86 with only one bore 88 between the adjacent mounting brackets and a two-knife cutterhead could be provided by mounting two brackets 90 opposite each other on the disks 86.

Proper operation of the cutter requires a limited clearance between the knives 96 and the shear bar 60 and between the knives 96 and the lower housing band 44. The cutterhead 82 is initially installed with the proper clearance between the knives 96 and the lower band 44 and the gauge screws 122 are preset to provide a predetermined clearance between the terminal ends 122 of the gauge screws and the knives 96. If the number of knives on the cutterhead is changed, the operator utilizes the gauge screws as a reference point when adjusting the added or shifted knives on the cutterhead, so that said predetermined clearance is obtained for each knife and the knives will trace identical cylindrical paths.

As previously described, adjustment of the knives on the cutterhead is accomplished by loosening the bolts 104 and adjusting the nuts 118 to move the eye-bolts 114 in the desired direction and thereby shift the knife in a radial direction relative to the cutterhead axis, the slot 106 in the mounting bracket permitting said radial adjustment. When the desired position of the knife is obtained, the bolt 104 is again tightened to lock the knife in place. As is apparent from the drawings, the eye-bolts 114 are shiftable in either direction to positively move the knife inwardly or outwardly, and the eye-bolts also provide additional support for the knives on the bracket when the two adjusting nuts 118 are tightened. Since the movement of each end of each knife 96 is in a generally radial direction relative to the cutterhead axis, the same amount of movement at both ends of the knife will produce the same change in cutterhead radius.

As is apparent from FIG. 2, the knives and their adjusting means are easily accessible through the access door 46 when they are opposite the gauge screws 120. By rotating the cutterhead in increments, successive knives may be positioned opposite the gauge screws and access door 46 to accomplish their adjustment. Of course, if the knives 96 are canted relative to the cutterhead axis, as shown in the drawings, the cutterhead must be rotated slightly after one end of the knife is set to position the opposite end of the knife opposite the other gauge screw, since the gauge screws are in transverse alignment. The gauge screws are adjustable so that different types of measuring devices, such as feeler gauges, may be used to measure the clearance between the knife and the gauge screws. The gauge screws may be set by first adjusting a knife for proper clearance with the housing band 44 and then setting the gauge screws to clear that particular knife by any predetermined amount.

After the knives are adjusted for proper clearance with the housing band 44 and for establishing the "true cylinder" condition of the cutterhead, the shear bar 60 is set for proper clearance with the knives by loosening the lock nuts 78 and setting the adjusting nuts 80, as previously described, the clearance between the knife cutting edge 98 and the shear bar being measurable through the small openings 62 and 64 in the right and left end walls 34 and 36 respectively, adjacent to the shear bar. If the knives are ground on the cutterhead, the shear bar is adjusted for proper clearance after each grinding. After substantial grinding, the knives may have to be adjusted outwardly on the cutterhead to provide proper clearance with the housing band 44, the knives being adjusted by means of the gauge screws as previously described.

Other features and advantages of the present invention will readily occur to those skilled in the art, as will many modifications and alterations in the preferred embodiment of the invention described herein, all of which may be achieved without departing from the spirit and the scope of the invention.

What is claimed is:

1. In a harvester having a mobile frame adapted to advance over a field, a generally cylindrical axially horizontal cutter housing having a longitudinally extending inlet and a generally tangential outlet, a shear bar parallel to the cutter housing axis and adjacent to said inlet, and means on the frame for moving crop material from the field and through said inlet, the combination therewith of a cylinder-type cutterhead coaxially rotatable within the housing for reducing the crop as it moves through the inlet and over the shear bar and impelling it through the outlet, said cutterhead comprising: a rotatable axial shaft; a plurality of angularly spaced knives having generally parallel cutting edges defining the outer periphery of the cutterhead and generating a cylinder as the cutterhead rotates and arcuate faces concave toward the direction of cutterhead rotation; and mounting means operatively connected to the shaft and the knives for mounting the knives on said shaft for rotation therewith and for selective adjustment in a linear generally radial direction relative to the axis of the cutterhead.

2. The invention defined in claim 1 wherein the mounting means includes a pair of axially spaced radial members coaxially attached to the shaft, a plurality of mounting brackets removably attached to each radial member in an equally spaced angular relationship, each mounting bracket being operatively connected to one end of a knife for supporting said knife in conjunction with a mounting bracket on the adjacent radial member.

3. The invention defined in claim 2 wherein the mounting means includes an adjusting means operative between each mounting bracket and the knife supported thereon for selectively adjusting the knife on the mounting bracket in a generally radial direction relative to the shaft axis and supporting the knife in its adjusted position.

4. The invention defined in claim 3 wherein the mounting means includes a locking means operative between each mounting bracket and the knife supported thereon for releasably locking the knife to the bracket in its adjusted position.

5. The invention defined in claim 4 wherein each knife extends diagonally relative to the cutterhead axis.

6. The invention defined in claim 1 wherein the cutter housing includes an access door adjacent to the outlet, selectively openable to provide access to the cutterhead, and also including a pair of gauge members mounted on and extending from the cutter housing toward the cutterhead periphery proximate to said access door, the guage members respectively having terminal ends proximate to the cutterhead periphery adjacent the opposite ends of the cutterhead.

7. An ensilage harvester comprising: a mobile frame adapted to advance over a field; a generally cylindrical axially horizontal cutter housing mounted on the frame and having a forward longitudinally extending inlet, a rearward outlet, a selectively operable rearwardly facing access door adjacent the outlet, and a lower, cylindrical section band portion therebetween; a shear bar mounted on the housing parallel to the housing axis and defining the lower edge of said inlet; a cylindrical cutterhead coaxially rotatable within said housing and including an axial shaft, a plurality of generally parallel knives equally spaced angularly at the cutterhead periphery and generating a cylinder as the cutterhead rotates, and mounting means operative between the shaft and the knives for removably connecting the knives to the shaft for rotation of the knives therewith and for adjustment of the knives thereon to change the cutterhead radius at each knife, the knives moving proximate to the shear bar and band portion during their rotation; a pair of gauge screws threadably mounted in the housing proximate to the outlet for selective adjustment in a generally radial direction relative to the cutterhead, the inner ends of the gauge screws respectively being disposed proximate to the cutterhead periphery adjacent the opposite ends of the cutterhead to provide reference points for gauging the adjustment of the opposite ends of each knife adjacent thereto.

8. The method of adjusting knives on a cylinder-type ensilage harvester cutterhead having a plurality of generally parallel knives angularly spaced about the cutterhead periphery, the opposite ends of each knife being independently adjustable to change the radius of the cutterhead at each end of each knife, and the cutterhead being mounted for coaxial rotation within a generally cylindrical axially transverse housing having a forward inlet, a rearward outlet and a cylindrical section band portion therebetween, said method comprising: providing a pair of gauge means mounted on the housing proximate to the outlet for adjustment in a generally radial direction relative to the cutterhead and respectively having inner ends disposed adjacent to the cutterhead periphery adjacent the opposite ends of the cutterhead; adjusting the opposite ends of a first knife to provide a predetermined clearance between the knife and the housing band portion; adjusting the gauge means to provide predetermined clearances between the respective gauge means and the opposite ends of said first knife; rotating the cutterhead to successively position the opposite ends of the other cutterhead knives opposite the respective gauge means and adjusting each end of each knife when it is opposite the gauge means to provide the same clearance between the knife and the gauge means as between the first knife and the first gauge means.

References Cited

UNITED STATES PATENTS

| | | |
|---|---|---|
| 2,005,551 | 6/1935 | MacDonald. |
| 2,829,691 | 4/1958 | Jarvis _____ 146—117 |
| 3,125,902 | 3/1964 | Blanshine _____ 76—104 |
| 3,126,931 | 3/1964 | Blanshine et al. ___ 146—117 XR |
| 3,370,628 | 2/1968 | Waldrop _____ 146—121 X |

W. GRAYDON ABERCROMBIE, *Primary Examiner.*

U.S. Cl. X.R.

33—185;146—107, 120